United States Patent [19]

Terry

[11] 4,083,639
[45] Apr. 11, 1978

[54] SHAFT END COUPLING FOR A DYNAMOELECTRIC MACHINE

[75] Inventor: Vincent G. Terry, Beverly, Mass.

[73] Assignee: General Electric Company, Schenectady, N.Y.

[21] Appl. No.: 755,756

[22] Filed: Dec. 30, 1976

Related U.S. Application Data

[63] Continuation of Ser. No. 510,673, Sep. 30, 1974.

[51] Int. Cl.² .............................................. F16B 3/00
[52] U.S. Cl. ...................................... 403/16; 403/336; 403/356; 64/28 R
[58] Field of Search ............... 403/336, 339, 358, 356, 403/357, 318, 319, 16; 64/28 R; 151/8

[56] References Cited

U.S. PATENT DOCUMENTS

| 536,583 | 3/1895 | Sedgwick | 403/318 X |
|---|---|---|---|
| 1,234,213 | 7/1917 | Reno | 403/356 X |
| 1,685,098 | 9/1928 | Skolovsky | 64/28 R |
| 1,814,858 | 7/1931 | Rutter | 151/8 X |
| 2,332,270 | 10/1943 | Shaw | 403/358 |
| 2,585,113 | 2/1952 | Gredell | 64/28 R |
| 2,676,279 | 4/1954 | Wilson | 403/337 X |
| 2,807,485 | 9/1957 | Seibert | 403/356 |
| 2,976,069 | 3/1961 | Meredith | 403/16 |

FOREIGN PATENT DOCUMENTS

| 1,400,768 | 4/1965 | France | 403/357 |
|---|---|---|---|
| 274,958 | 7/1951 | Switzerland | 403/356 |

*Primary Examiner*—Andrew V. Kundrat
*Attorney, Agent, or Firm*—James W. Mitchell; John F. Ahern; Herbert E. Messenger

[57] ABSTRACT

A coupling member is shrink fitted onto the end of a dynamoelectric machine shaft and keyed thereto with a plurality of hollow keys of circular cross section which distort if excessive torque is applied to the coupling, reducing the risk of coupling failure. This coupling exhibits the properties of high strength and low weight which eliminates lateral shaft resonance at operating speeds.

1 Claim, 2 Drawing Figures

SHAFT END COUPLING FOR A DYNAMOELECTRIC MACHINE

This is a continuation, of application No. 510,673, filed Sept. 30, 1974.

BACKGROUND OF THE INVENTION

1. Field of the Invention

This invention relates to shaft end couplings for dynamoelectric machines. More particularly, this invention relates to a keyed arrangement for maintaining the alignment of a dynamoelectric machine rotor shaft and a coupling member shrink fitted onto that shaft.

2. Description of the Prior Art

In mechanically connecting rotor shafts of dynamoelectric machines and prime movers such as turbines, coupling members are fixed to both shafts and mechanically connected together as by bolts or other devices well known in the art. It has been the practice to maintain the alignment of the coupling members with the corresponding shafts by keying the two elements together with two keys comprising elongated members of square or rectangular cross section. Prior to assembly, mating grooves are machined in the rotor shaft and the coupling member separately. The coupling member is then shrink fitted on the shaft such that the grooves in the shaft mate with the corresponding grooves in the coupling member. To complete the assembly, the keys are inserted in keyways formed by the mating grooves in the shaft and coupling member. The limitation to only two keys in such prior art couplings was necessitated by the difficulty involved in the alignment of these grooved members in the shrink fitting operation. The magnitude of such difficulties increases with an increased number of keys. Therefore, it is necessary to provide over-sized keyways in these elements so that should such misalignment occur, the keys may still be accommodated in the keyways.

This difficulty in aligning two grooves to form a keyway is one of a number of disadvantages associated with such prior art keying arrangements. Since only two solid rectangular keys are used in prior art couplings, it is necessary that such keys and the corresponding coupling member be of relatively great length to provide the required strength. However, this large key length has associated with it a large coupling weight which may cause lateral shaft resonance at normal operating speeds damaging the shaft and various members fixed thereto. The use of only two keys makes it necessary that such keys be formed from high strength steel which upon shearing of the keys may damage the shaft and the coupling member. Moreover, solid rectangular keys are relatively inelastic. Thus, when excessive torque is applied to the shaft through the coupling member, the keys fail without distorting elastically and without accommodating the excessive torque. Finally, the sharp corners of the grooves machined in the shaft and coupling member to accommodate keys of square or rectangular cross section define areas of high stress concentration. The presence of such areas has a weakening affect on the shaft.

It is therefore an object of this invention to provide a novel and improved keying arrangement for use in dynamoelectric machine or turbine couplings which has assocated with it accommmodating keyways in a shaft and coupling member formed from grooves which are incapable of being misaligned.

It is another object of this invention to provide a novel and improved keying arrangement for use in dynamoelectric machine or turbine couplings characterized by low cost and ease of manufacture.

It is another object of this invention to provide a novel and improved keying arrangement for use in dynamoelectric machine or turbine couplings which is characterized by a relatively short length and thus permits utilization of a relatively light-weight associated coupling member thereby preventing lateral shaft resonance at operating speeds.

It is another object of this invention to provide a keying arrangement for a dynamoelectric machine or turbine coupling utilizing keys made from a relatively low strength material which will not damage the shaft or coupling member in the event of a failure of the coupling.

It is another object of the present invention to provide a keying arrangement for a dynamoelectric machine or turbine coupling which will elastically distort when excessive torque is applied to the coupling, preventing the shearing of the keys under such conditions.

It is another object of the present invention to provide a keying arrangement for a dynamoelectric machine or turbine coupling having associated with it keys and accommodating grooves in the shaft and coupling member which have no sharp corners.

SUMMARY OF THE INVENTION

The objects of the present invention are attained by providing in a dynamoelectric machine or a turbine coupling keys disposed between the shaft and the associated coupling member which are cylindrical in shape and hollow. In accordance with this invention, a plurality of such keys numbering six or more are used. In assembly, the coupling member is first shrink fitted onto the shaft. This sub-assembly is then drilled and reamed to form keyways. The cylindrical keys are then inserted, completing the assembly. Since the coupling member is fixed to the shaft before the keyways are formed, there is no difficulty encountered in aligning grooves in these two elements to form a single keyway.

DESCRIPTION OF THE PREFERRED EMBODIMENT

Figure 1:
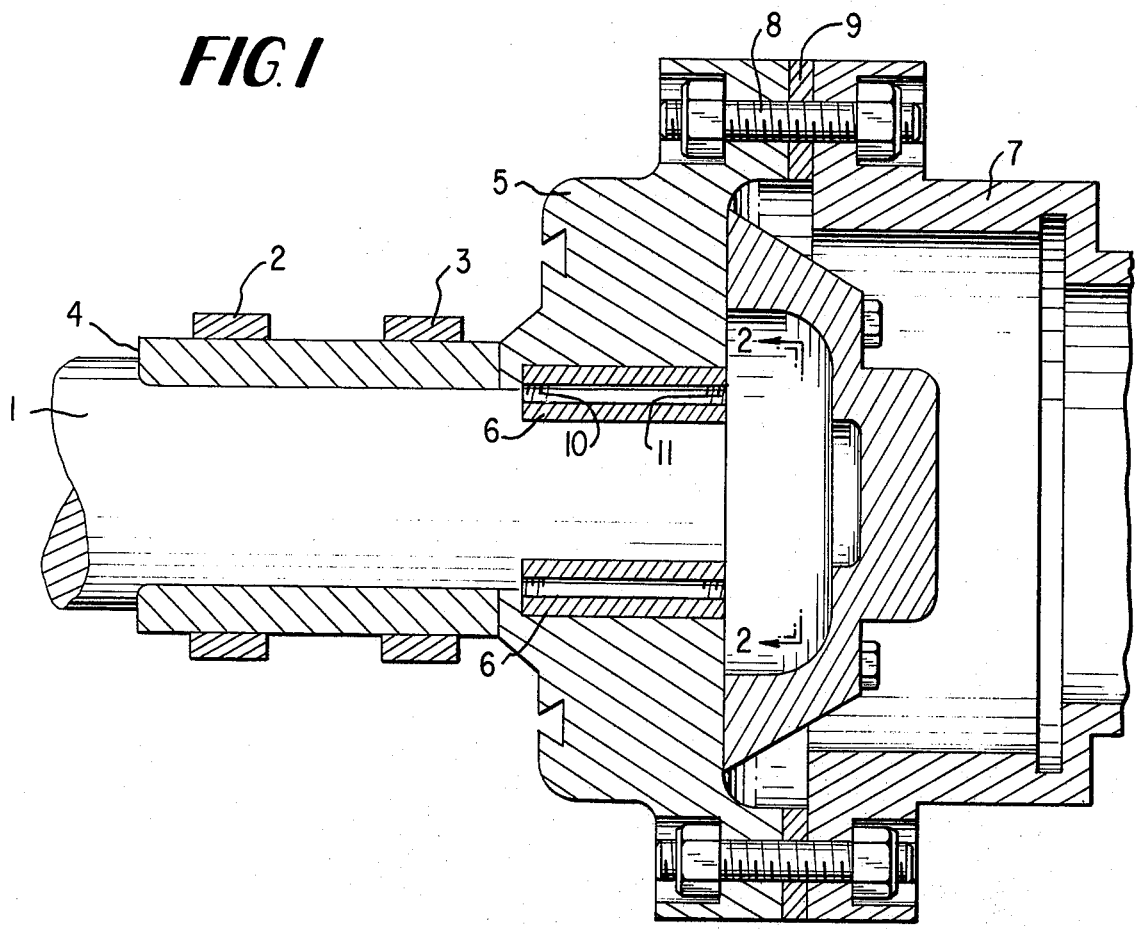
FIG. 1 is a view in partial section of a preferred embodiment of the invention.
Figure 2:
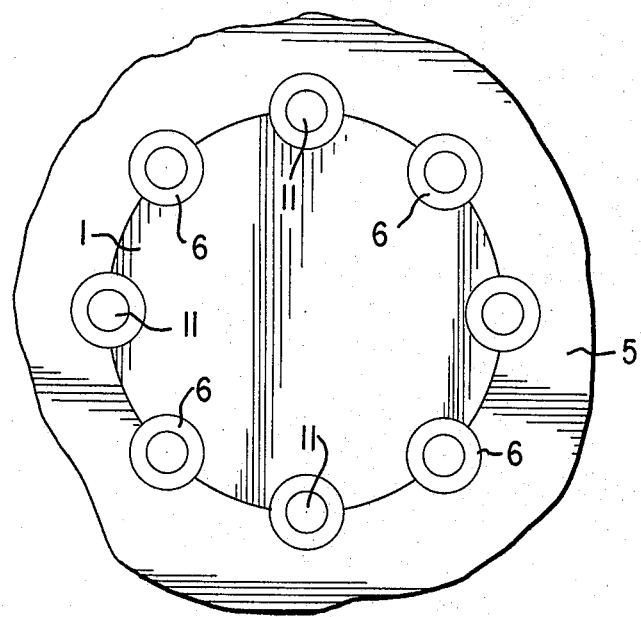
FIG. 2 is an end view taken along line 2—2 of FIG. 1 and is enlarged to show details of the invention.

Referring to FIGS. 1 and 2, there is shown a dynamoelectric machine rotor shaft 1 supported by any suitable bearing (not shown). Two collector rings 2 and 3 are shrink fitted to an insulated collector shell 4 which is itself shrink fitted to the shaft 1.

A generally annular coupling member 5 is shrink fitted to the shaft at the collector end thereof and maintained in alignment therewith by a plurality of hollow cylindrical keys 6. A second coupling member 7 fitted to the end of a rotatable prime mover shaft (not shown) is fixed to the first coupling member 5 by bolts 8 and is spaced therefrom by a spacer 9. Therefore, it can be seen that a rotation of the prime mover shaft will cause a corresponding rotation of the dynamoelectric machine shaft coupled thereto.

Referring particularly to FIG. 1, each of the keys 6 comprises a hollow elongated cylindrical member. The ends of the keys are interiorly threaded at 10 and 11. These threaded portions are engageable by a tool having mating threads for effecting the insertion of the keys into and withdrawal of the keys from the keyways during the assembly and disassembly of the coupling member and the shaft. In order to insure that the threaded portion will be available for ready engagement with the mating tool no matter which end is inserted in the keyway, both end portions 10 and 11 are similarly threaded.

Referring now in particular to FIG. 2, the ease of assembly of the coupling is evident. In the assembly operation, coupling member 5 is first shrink fitted onto shaft 1. This sub-assembly is then drilled and reamed at circumferentially spaced points around the periphery of shaft 1 forming bores or keyways accommodating keys 6. It should be noted that this drilling and reaming operation is much simpler to perform than the separate grooving operations of the shaft and coupling member required in forming keyways for receiving keys of square or rectangular cross section. Moreover, since the shaft and coupling member are assembled before the keyways are formed, there are no difficulties encountered in the alignment of grooves in these members when they are assembled as was the case in the assembly of prior art couplings.

Again referring to FIG. 2, it can be seen that the ease of assembly of the coupling member, the shaft, and the keys, makes possible the use of a relatively large number of such keys. In this embodiment, eight such keys are employed providing a juncture between coupling member 5 and shaft 1 of higher strength than was attainable with prior art keying arrangments. It is convenient to make electrical connections to the collector rings by extending leads through the shaft-coupling member interface. The high strength juncture provided by this invention reduces the risk of any relative movement between these members which would damage the leads.

Since such a large number of keys are employed, the length of each key and thus its associated length of contact with coupling member 5 and shaft 1 is reduced over the required length of prior art solid rectangular keys. The difficulty in machining the grooves in the shaft and the coupling member and effecting the alignment of the grooves when those members were assembled limited the prior art structures to the employment of only two keys which therefore were required to be of substantial length. Therefore, coupling members of substantial length and thus high weight were also employed. These heavy members caused the shaft to laterally resonate at operating speeds. The coupling member 5 of the present invention may be made shorter in the axial direction than prior art coupling members allowing the coupling to be of relatively short length and light weight, preventing lateral shaft resonance at operating speeds.

Moreover, the use of such a large number of keys permits the manufacture of these keys from relatively low-strength steel. Therefore, if the coupling should fail, that is, should the keys shear, no damage to the shaft and the coupling member will result.

The hollow construction of the keys of the present invention makes the coupling somewhat elastic. Should excessive torque be applied to the coupling from the prime mover, the keys will distort reducing the risk of failure of the keys which has been associated with prior art couplings. Finally, it can be seen that keyways of circular cross section accommodating the keys of the present invention do not have associated with them areas of stress concentration within the shaft and the coupling member as do the prior art keyways of square or rectangular cross section. Therefore, the shaft and the coupling member employed in the present invention are capable of higher torque transmission than prior art shafts and coupling members.

It can be seen then that the provision of a large number of hollow cylindrical keys in such an arrangement gives the coupling in which these keys are used the properties of ease of construction, high strength, short length and low weight, elasticity, an relative freedom from areas of high stress concentration.

Modifications of the apparatus may be employed by those skilled in the art without departing from this invention and it is intended by the appended claims to cover such modifications.

What is claimed as new and desired to be secured by Letters Patent of the United States is:

1. A coupling arrangement for connecting a driving shaft to a driven shaft, said driving shaft having an annular flange at the coupling end thereof, said coupling arrangement comprising:

a coupling member having an annular flange portion mating with and attachably secured to said driving shaft annular flange; said coupling member having an inner axial bore and shrunk on and tightly engaging said driven shaft at a common annular interface;

a plurality of cylindrical keyways, extending in the axial direction, spaced circumferentially about the common annular interface, each keyway being drilled into a portion of said coupling member and a portion of said driven shaft subassembly; and, an elongated, hollow, deformable metal key of cylindrical cross section inserted into each keyway with its end free continguous with the end faces of said coupling member and said driving shaft whereby relative rotation between the driven shaft and coupling member is prevented and each said keys are threaded along the interior adjacent its end face thereof for mating with a tool to effect the insertion or withdrawal of said keys.

* * * * *